Oct. 14, 1952 P. R. PRETZER 2,613,581
SOIL MIXING ATTACHMENT FOR POWER TRACTORS
Filed May 26, 1948 2 SHEETS—SHEET 1

INVENTOR
PAUL RICHARD PRETZER
BY *Hyde, Meyer, Baldwin & Doran*
ATTORNEYS

Oct. 14, 1952 P. R. PRETZER 2,613,581
SOIL MIXING ATTACHMENT FOR POWER TRACTORS
Filed May 26, 1948 2 SHEETS—SHEET 2

INVENTOR
PAUL RICHARD PRETZER
BY Hyde, Meyer, Baldwin & Doran
ATTORNEYS

Patented Oct. 14, 1952

2,613,581

UNITED STATES PATENT OFFICE 2,613,581

SOIL MIXING ATTACHMENT FOR POWER TRACTORS

Paul Richard Pretzer, Bratenahl, Ohio

Application May 26, 1948, Serial No. 29,395

2 Claims. (Cl. 97—6)

This invention relates to agricultural tractor mechanism, and more particularly to soil mixing attachments therefor.

In the preparation of soil for planting it is customary to trail both plow and harrow or soil mixer behind a power tractor. In a large greenhouse, where many acres of vegetables are grown under cover, the total length of the train (tractor, plow and harrow) presents a serious problem in turning the train, at the end of the row, in the very limited space available between roof supporting pillars, or on account of other obstructions or local conditions. Further, the long trailing train is difficult to manipulate in transportation to and from the place of work.

The present invention aims to provide a simple and effective solution for the difficulties, supplying an improved organization of the harrow with the tractor, or with both tractor and plow when the latter is used, enabling the soil working implement or implements to be used in the most efficient manner, but nevertheless capable of manipulation to enable short turns to be accomplished, and making it possible to pack the implements upon the tractor in compact form or arrangement not only suitable for convenient transportation from place to place, but also for safeguarding against possible overturn of the tractor when the trailing implements are folded upon it.

Another object is to provide an improved tractor-harrow combination including an idle section between and artciulated to both harrow and tractor by means of which the harrow may be elevated or folded to an idle position above the rear end portion of the tractor, so that the assembly thus arranged is relatively short and compact and is capable of turning movement within close quarters and is not likely to overturn.

Further objects of the invention in part are obvious and in part will appear more in detail hereinafter.

In the drawings, Fig. 1 represents a side elevation of one arrangement embodying the invention, part only of the tractor being shown;

Figure 1:
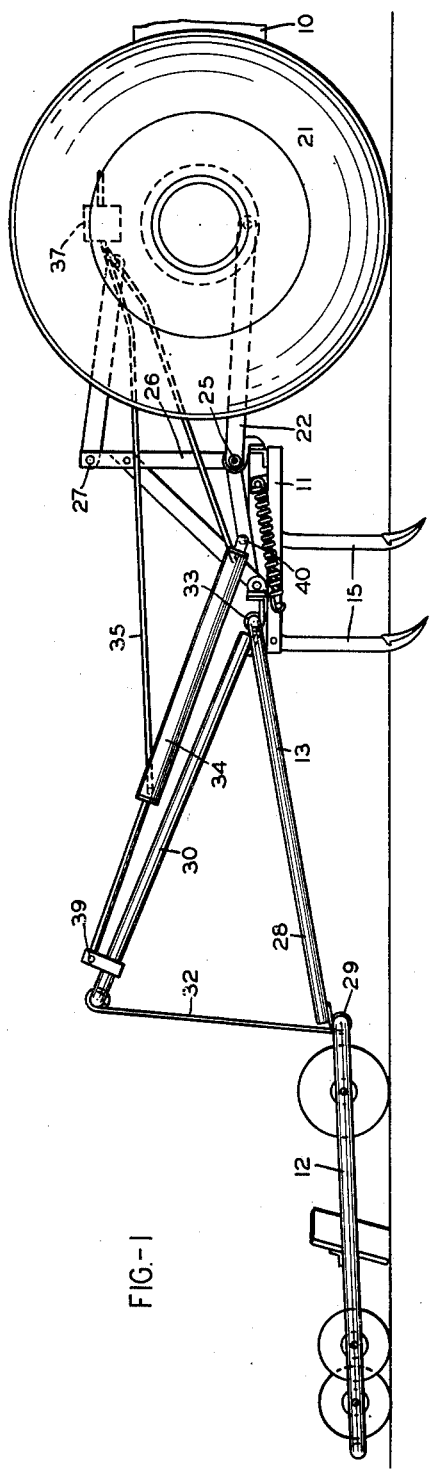

Referring first to Fig. 1 I illustrate, hooked together in tandem operating relation, a tractor 10, a plow or digging member 11, and a soil mixing member or harrow 12, between two of which is interposed an idle section or elevator member 13. So far as their soil manipulating functions and structure are concerned, plow and harrow members 11, 12 may be of any suitable form or construction. Plow member 11, for example, may comprise a suitable open rectangular frame 14 supporting one or a plurality of blades, shares or teeth 15, while harrow 12 may consist of a similar open, but larger, frame 16 upon which are mounted a number of soil mixing members such as teeth or discs 17, the latter being shown. This frame may also be provided with one or more devices for leveling, scraping, or smoothing, such as boards, scrapers, blades, or the like.

The tractor 10 may also be of any suitable or desired form, and is illustrated, more or less conventionally, as the well-known Ford tractor provided with Ferguson linkage.

Figure 5:
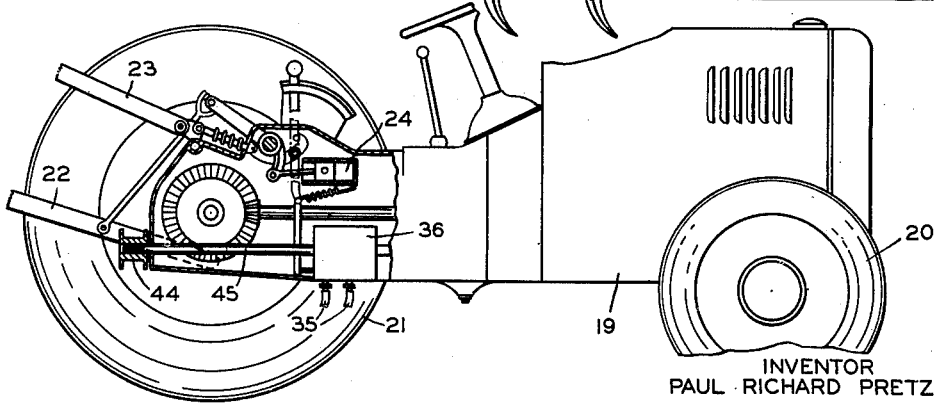
Fig. 5 is a side elevation, partly broken out and in diagram form, illustrating a conventional or typical tractor with which my improved attachment may be employed.

Referring to Fig. 5, this tractor includes a frame or chassis 19 supported upon front wheels 20 and rear wheels 21, and provided with the usual two lower Ferguson tension links 22 and single upper compression link 23. Tension links 22 are adjustable up and down by servomotor 24 and the usual intervening connecting mechanism requiring no description, except to note that either tension link may be elevated independently of the other, or the two may be operated in unison, as desired.

The plow frame 14 is pivotally hitched or connected, on a horizontal axis, to the outer ends of links 22 at 25 and has rigidly attached thereto an upwardly extending arm 26 which is pivoted at 27 to the outer end of the Ferguson upper or compression link 23. The result is that as the tension links 22 are raised or lowered, the plow frame moves up or down, to any desired position, with a sort of parallelogram linkage motion, its general plane remaining horizontal, unless lateral tilt is desired. That may be accomplished by elevating one of the tension links 22 more than the other. These adjustments are employed for setting the plow blades or shares to the necessary or desired digging depth as in Fig. 1, or to tilt the train laterally when the ground is uneven, or for elevating the plow to inoperative or transporting position in Fig. 3.

The elevator or idle member or unit 13 of the train is strong but of open form. It is shown as consisting of a generally U-shaped rigid frame member 28, the outer ends of the arms of which are hinged to the forward portion of the harrow frame on a transverse horizontal axis at 29. To the cross bar of member 28 are connected two converging arms 30 joined at their rear ends by a short bar 31 from which a rigid link 32 extends down to the middle point of the front member of the harrow frame. Member 13, considered as a unit, is a strong rigid device, hinged to the rear portion of the plow frame on a transverse horizontal axis at 33, coaxial with the cross bar of member 28.

Figure 3:
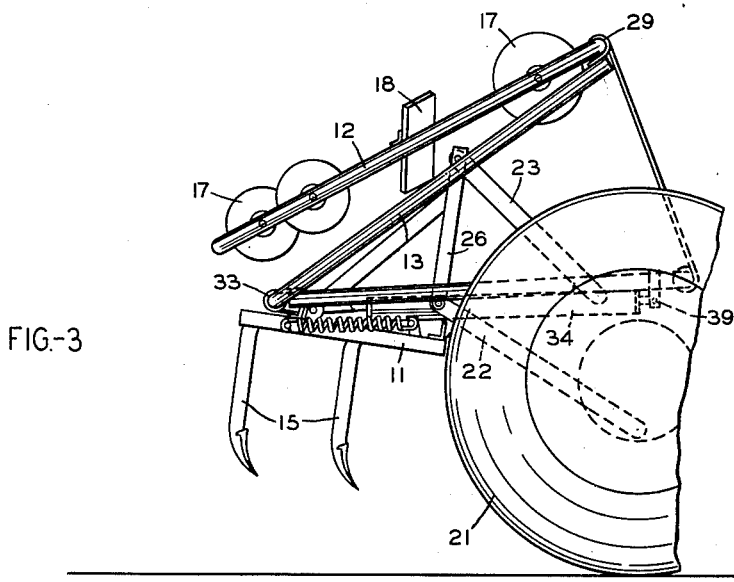
Fig. 3 is a view corresponding to Fig. 1, but showing the parts folded to compact idle or transporting position.

The intermediate elevator member 13 is provided with operating connections by means of which it may be raised or lowered, or, more accurately, may be swung up or down around the hinge axis 33 from the operating position Fig. 1 to the transportating position, Fig. 3, or vice versa. These connections may be of any form suitable for the purpose, but preferably are power operated but under operator control.

Figure 2:
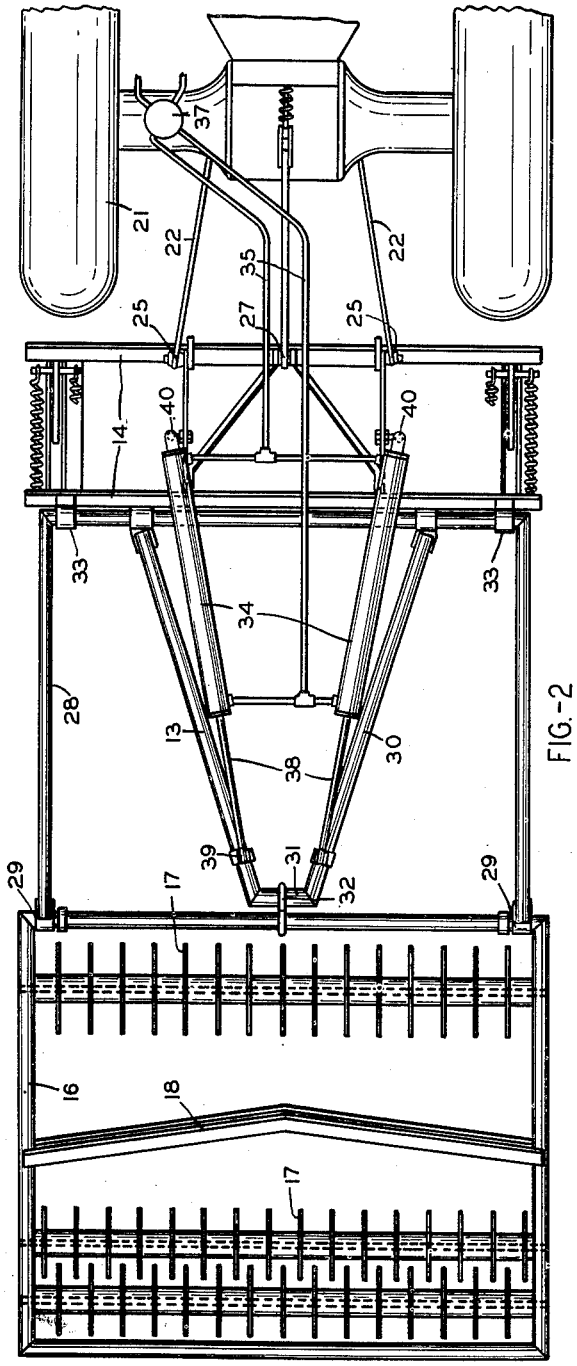
Fig. 2 is a plan view thereof.

In Figs. 1 to 3 I show for the purpose two parallel coacting double acting fluid pressure servomotors 34 provided with flexible pipe connections 35 to the usual hydraulic pump 36, said connections being provided with a suitable operator-operated control valve 37, located on the tractor at some point within reach of the operator in his seat, by operation of which fluid pressure may be admitted selectively to either end of the servomotor chambers and evacuated from the other end. The piston rods 38 are pivotally connected to the elevator frame at 39, and at 40 the cylinders are pivoted to a part of the plow frame fairly close to but spaced from the pivotal axis 33.

Operation is as follows:
Figs. 1 and 2 show all parts in their operating positions assumed when the soil is being worked. By operation of the tension links 22 the plow blades or shares have been lowered to the desired plowing level. The servomotors 34 have been extended, so that elevator member 13 is down in generally horizontal position with the harrow trailing behind it. As the train advances (to the right in Fig. 1) the plow opens and turns the soil, lumps therein being broken up, mixed and levelled by the trailing harrow. By maintaining fluid pressure in the front ends of the servo motors 34, tending to force out their piston rods, extra downward pressure may be applied to force the meeker blades into the soil, thus eliminating any necessity for extra weight for the purpose.

When the end of a row is reached, or it is desired to turn, and space is limited or restricted, servomotors 34 are first contracted to lift the elevator, and then the links 22 are elevated until the parts reach the positions shown in Fig. 3. The elevator has turned through substantially 180 degrees and occupies an inverted horizontal position above the rear portion of the tractor. Such position is readily reached because the pivotal axes 33 and 40, although fairly close together are spaced apart at about the same low level, and the servomotor pistons readily adjust and accommodate themselves to overturning movement of the elevator to its final inverted generally horizontal position. The elevator and the servo motors 34 have been turned or swung through an angle of substantially 180 degrees and the harrow occupies a tilted position above the elevator and somewhat forward of the plow and rear portion of the tractor, with its general plane somewhat inclined or tilted, thus shortening the entire train and enabling it to be turned on a short radius.

When the train has reached its new position, ready to advance, the links 22 are lowered first and then the servomotors are extended, thus lowering the harrow until its rear portion engages the ground, whereupon advance of the train with continued lowering of the elevator unfolds the harrow and restores it to its former horizontal working position. Soil preparation now may be continued, as before.

Figure 4:
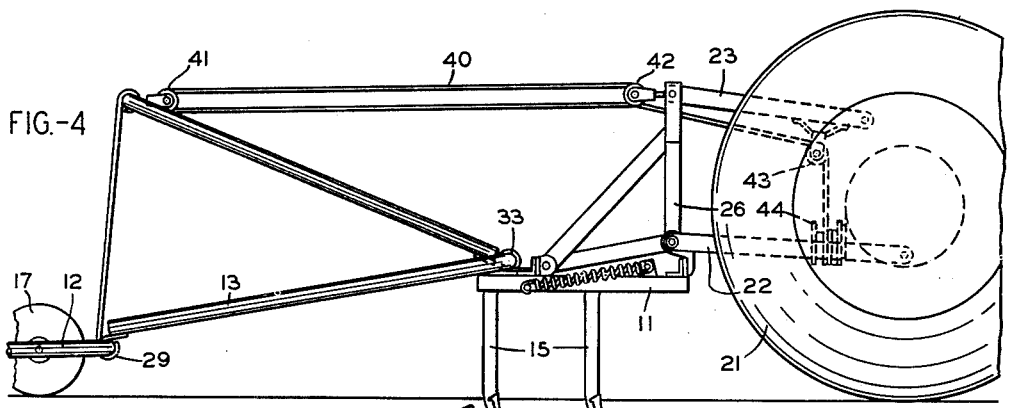
Fig. 4 is a view, corresponding to Fig. 1, illustrating a modified form of lifting means for the harrow.

Fig. 4 shows another form of operating connections for elevator member 13, here of block and tackle form. That is, I provide a cable 40 suitably dead ended at one end, traveling over tackle pulleys 41, 42, one on the elevator, the other on the plow frame upright arm 26, and reeved over pulley 43 to a winding drum or pulley 44 on the usual power take-off shaft 45, capable of manual control, as is usual in the Ford tractor.

Fig. 4 shows the parts in working position. By closing the clutch in the drive to the power take-off, shaft cable 40 is wound up upon drum 44, thus lifting the elevator and harrow, to their idle or transport positions, as before. To restore them to working position the operator pushes the parts back, using the tackle to control downward movement and prevent undesirable shock.

With either form, the harrow and plow may be adjusted to their elevated positions to thus fold the train into compact form and facilitate travel to and from the place of work, or when placing the parts in storage or for other purposes. All control parts, including not only those for the Ferguson compression and tension links, but also those for the elevator lifting or actuating mechanism, are within reach of the operator while sitting in his seat. Thus it is unnecessary for him to leave his seat, thereby avoiding any possibility of accidental or unexpected tractor operation when the operator is on the ground. Also all of the mechanism involved may be operated and controlled by a single operator, thus not requiring the services of any extra operator for the purpose.

Since the plow frame 14, elevator frame 13 and harrow frame 16 are all rigid units, each two coupled together on an elongated horizontal axis, the complete train, when in operation, tracks a straight path, with no weaving of any trailing part from side to side about a vertical axis with respect to those parts which precede it. Nor is there any chance for twist of any trailing part around a longitudinal axis, except that, by manual operation of the controls for the tension links 22, either side of the trailing units may be lifted above the other, thus tilting the trailing implements to an appropriate position on uneven ground, or for other purposes.

Other advantages of the invention will be apparent to those skilled in the art.

What I claim is:

1. Agricultural apparatus of the character described, comprising the combination with a tractor provided with pivoted upper compression and lower tension links and operating means therefor, of a plow member pivotally connected to said links on a pair of spaced horizontal transverse axes, a trailing harrow member, an elevator intervening between said members and pivotally connected to each on respectively different horizontal transverse axes, and means operatively connected to said elevator for swinging the same upwardly around the axis of its pivotal connection to the plow member, to thereby raise the elevator into an inverted generally horizontal position above the rear portion of the tractor and the harrow member into a position where it is superposed upon the elevator, thus enabling the train to be turned on a short radius and the trailing parts thereby transported without liability of overturn of the tractor.

2. Agricultural apparatus of the character described, comprising the combination with a tractor provided with pivoted upper compression and lower tension links and operating means therefor of a plow member pivotally connected to said links on a pair of spaced horizontal transverse axes, a trailing harrow member, an elevator intervening between said members and pivotally connected to each on respectively different horizontal transverse axes and means operatively connected to said elevator for swinging the same upwardly around the axis of its pivotal connection to the plow member, to thereby lift the harrow member into transporting position, said means being connected to the elevator member at an elevated point near its trailing end.

PAUL RICHARD PRETZER.

REFERENCES CITED

The following references are of record in the file of this patent:

UNITED STATES PATENTS

| Number | Name | Date |
| --- | --- | --- |
| 157,603 | Holladay | Dec. 8, 1874 |
| 1,022,354 | Builta | April 2, 1912 |
| 1,765,746 | Stubenberg | June 24, 1930 |
| 2,110,186 | Weimer | March 8, 1938 |
| 2,296,858 | Larison | Sept. 29, 1942 |
| 2,303,320 | Benjamin et al. | Dec. 1, 1942 |
| 2,398,147 | McKay | April 9, 1946 |